United States Patent Office 3,637,675
Patented Jan. 25, 1972

3,637,675
PIPERIDYL AND PYRIDYL COMPOUNDS
Bernard Brust, Jacksonville, Fla., and Rodney Ian Fryer, North Caldwell, and Leo Henryk Sternbach, Upper Montclair, N.J., assignors to Hoffmann-La Roche Inc., Nutley, N.J.
No Drawing. Application June 21, 1965, Ser. No. 465,774, now Patent No. 3,420,836, which is a continuation-in-part of application Ser. No. 380,949, July 7, 1964. Divided and this application Sept. 26, 1968, Ser. No. 763,021
Int. Cl. C07d 29/26
U.S. Cl. 260—240 F    12 Claims

ABSTRACT OF THE DISCLOSURE

Piperidyl compounds and derivatives which are useful as anticonvulsants and also as intermediates in the preparation of related piperidyl compounds of pharmacologically important activity.

RELATED APPLICATIONS

The present application is a divisional of Ser. No. 465,774 now U.S. Pat. No. 3,420,836, filed June 21, 1965 which in turn was a continuation-in-part of Ser. No. 380,949, filed July 7, 1964 now abandoned.

DESCRIPTION OF THE INVENTION

This invention relates in general to novel compounds and to processes for the production thereof. More particularly, the invention relates to pharmacologically active piperidyl compounds and to processes for producing same.

The compounds of this invention, broadly, are selected from the group consisting of members having the formula

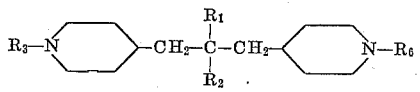

in which $R_1$ is a member selected from the group consisting of hydrogen, an alkyl group having from 1 to 12 carbon atoms, a cycloalkyl group having from 3 to 8 carbon atoms, an aryl radical, an aralkyl radical, a 5-member saturated heterocyclic radical and a 6-member saturated heterocyclic radical;
in which $R_2$ is a member selected from the group consisting of hydrogen and hydroxy;
in which $R_3$ is a member selected from the group consisting of hydrogen and an alkyl group having from 1 to 6 carbon atoms; and
in which $R_4$ is a member selected from the group consisting of hydrogen and an alkyl group having from 1 to 6 carbon atoms and salts thereof with medicinally acceptable acids.

The term "alkyl" which appears in the immediately preceding paragraph, and which, in various instances, will appear in the paragraphs following hereinafter, includes both straight and branched chain radicals, which are substituted or unsubstituted. Moreover, the term "aryl" and "aralkyl" and the expression 5- and 6-member saturated heterocyclic radicals, which are used in the preceding paragraph, and which will be used in subsequent paragraphs, include substituted as well as unsubstituted radicals. The expression "medicinally acceptable acids" which will be used throughout the specification and in the claims embraces inorganic acids, such as, hydrochloric acid, nitril acid, etc., as well as organic acids, such as, maleic acid and p-toluene sulfonic acid.

One group of compounds which are produced in the practice of this invention are those having the formula

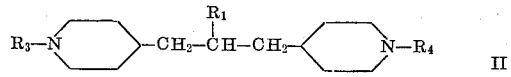

in which the symbol $R_1$ is a member selected from the group consisting of hydrogen, an alkyl group having from 1 to 12 carbon atoms, a phenyl radical, a halogen-substituted phenyl radical, a lower alkyl-substituted phenyl radical, a lower alkoxy-substituted phenyl radical, a lower alkylmercapto-substituted phenyl radical, a cycloalkyl radical having from 3 to 8 carbon atoms and a benzyl radical;
$R_3$ is a member selected from the group consisting of hydrogen and an alkyl group having from 1 to 6 carbon atoms; and
$R_4$ is a member selected from the group consisting of hydrogen and an alkyl group having from 1 to 6 carbon atoms and salts thereof with medically acceptable acids.

A preferred group of compounds falling within the scope of Formulas I and II are those having the formula

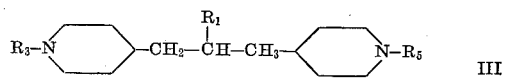

in which $R_1$ is hydrogen, an alkyl group having from 1 to 12 carbon atoms, a phenyl radical, a lower alkyl-substituted phenyl radical, a halogen-substituted phenyl radical or a cyclohexyl radical; and
in which the symbols $R_3$ and $R_4$ have the same meanings as in Formulas I and II and salts thereof with medicinally acceptable acids.

A second group of compounds falling within the scope of Formula I are those having the formula

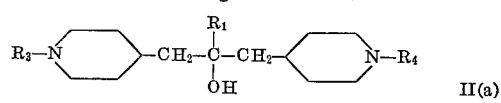

in which the symbols $R_1$, $R_3$ and $R_4$ have the same significance as in Formula I, and acid addition salts thereof.

Additionally, the invention embraces compounds having the formula

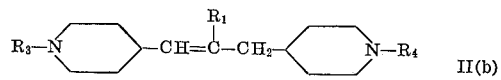

in which the symbols $R_1$, $R_3$ and $R_4$ have the same significance as in Formula I.

The compounds of Formula II(b) are obtained by the dehydration of the Formula II(a) compounds.

As used in this specification, the expression "lower alkyl" denotes an alkyl group having from 1 to 6 carbon atoms. The expression "halogen" includes chlorine, bromine, fluorine and iodine.

The alkyl groups, which in the foregoing Formulas I, II, II(a) and II(b) and III are represented by the symbol $R_1$ includes, for example, methyl, ethyl, propyl, butyl, isopropyl, pentyl, hexyl, heptyl, etc., radicals as well as such radicals substituted with a cycloalkyl radical, for example, a cyclohexyl radical. The cycloalkyl groups, which in Formulas I, II, II(a) and II(b) as represented by the symbol $R_1$ include, for example, cyclopropyl, cyclobutyl, cyclopentyl, cyclohexyl, cycloheptyl and cyclooctyl radicals. Specific examples of the aryl radicals which are represented in Formulas I, II, II(a), II(b) and/or III by the symbol $R_1$ are a phenyl radical; lower alkyl-substituted phenyl radicals, such as, methylphenyl, ethylphenyl, propylphenyl, butylphenyl, etc. radicals; halogen-substituted phenyl radicals, such as, fluorophenyl, bromophenyl, etc.; lower alkoxy-substituted phenyl radicals, such as, methoxyphenyl, ethoxyphenyl, etc., radicals; lower alkyl-mercapto-phenyl radicals, such as, methylmercapto-phenyl, ethylmercapto-phenyl, etc. radicals. Benzyl is an example of an aralkyl radical which, in Formulas I, II, II(a) and II(b), is represented by the symbol $R_1$. Specific examples of the 5- and 6-member saturated heterocyclic radicals, which in Formulas I, II(a) and II(b) are represented by the symbol $R_1$, include, pyrrolidinyl, tetrahydrofuryl, tetrahydrothienyl, piperidyl, tetrahydropyranyl, tetrahydrothiopyranyl, etc. radicals, as well as, lower alkyl-substituted derivatives, for example, methyl, ethyl, propyl, etc., thereof.

The compounds of Formulas I, II and III are readily produced by any one of several processes. In a first such process a compound having the formula

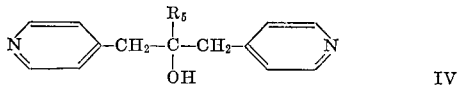   IV in which $R_5$ is an alkyl group having from 1 to 12 carbon atoms, an alkenyl group having from 2 to 12 carbon atoms, an alkenyl group having from 2 to 12 carbon atoms, a cycloalkyl group having from 2 to 8 carbon atoms, an aryl radical, an aralkyl radical, a 5-member heterocyclic radical and a 6-member heterocyclic radical or a hydrogen atom is reacted with hydrogen using a suitable hydrogenation catalyst in the presence of an acid. As the catalyst system, there can be used, for example, platinum in hydrochloric acid. In effecting this reaction, the amount of hydrogen used will be dependent upon the degree of unsaturation in the starting material. For example, in this method not only will the terminal pyridyl groups be converted into piperidyl groups, but also alkenyl and alkynyl groups and unsaturated 5- and 6-member heterocyclic radicals, if any of such groups or radicals are, in fact, present, will be converted into the respective saturated counterparts. The hydrogenation is carried out, ordinarily, at a temperature elevated above about room temperature and under pressure. Preferably, the catalytic hydrogenation reaction is carried out at the temperature within the range of about 45° to 75° C. under a hydrogen pressure of from about 40 to about 80 atmospheres.

In a second preparative method for the compounds of Formulas I, II and III the compound of Formula IV is reacted with a dehydrating agent to obtain a compound having the formula

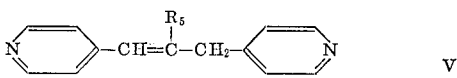   V in which the symbol $R_5$ has the same meaning as in Formula IV.

Dehydration of the Formula IV compound to obtain the desired intermediate Formula V compound is effected, conveniently, by heating the Formula IV compound, preferably at a temperature within the range of from about 60° to about 100° C., with a concentrated mineral acid, such as, sulfuric acid, hydrochloric acid, nitric acid, etc. If desired, however, the dehydration reaction can be carried out using, as the dehydrating agent, a phosphorous trihalide, such as, phosphorous trichloride, phosphorous tribromide; acetic anhydride; or a mixture of acetic anhydride and zinc chloride. Moreover, the dehydration can be carried out by refluxing the Formula IV compound in a solution of iodine in, for example, benzene, xylene, toluene, etc.

In a next step in this second preparative method, the Formula V compound is converted into a propane compound having the formula

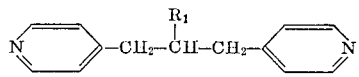

wherein $R_1$ has the same meaning as in any of Formulas I, II or III, by hydrogenation. In this step, the hydrogenation is effected by catalytic means using, for example, palladium, platinum, Raney nickel, etc., as the catalyst. Temperatures and pressures will be variable depending upon the compound to be hydrogenated and the catalyst used. Subsequently, the terminal pyridyl radicals of the Formula VI compound are converted, by hydrogenation into piperidyl radicals to thus yield the compound of Formula I, II or III wherein $R_3$ and $R_4$ are hydrogen. Hydrogenation of the pyridyl groups is carried out, catalytically, using platinum in hydrochloric acid or rhodium in ethanol.

In an alternate embodiment, the propene compound of Formula V is reacted with hydrogen, in the presence of platinum in hydrochloric acid or rhodium in ethanol as a catalyst, to yield, directly, the desired compound of Formula I, II or III. With respect to the latter reaction, it has has been found that, where platinum in hydrochloric acid is used as the catalyst, a mixture is obtained when the compound in use contains a phenyl group at the 2-position, i.e., where the compound to be hydrogenated is a Formula V compound in which R is phenyl. Such mixture contains predominately the compound of Formulas I, II or III in which $R_1$ is a phenyl radical. However, there is present also in the reaction mixture, a compound of Formula I, II or III in which $R_1$ is a cyclohexyl group.

The N-alkyl-substituted compounds of Formulas I, II and III can be obtained by any conventional alkylation procedures from the corresponding unsubstituted compound. Thus, for example, the compounds of Formulas I, II or III in which $R_3$ and $R_4$ are methyl groups can be prepared by reacting the compounds of Formulas I, II or III wherein $R_3$ and $R_4$ are hydrogen atoms, with a mixture of formic acid and formaldehyde.

In another alternative preparative method, an alcohol of Formula IV is quaternized by any conventional means, for example, using an alkyl halide, to yield a compound having the formula

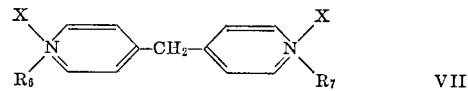   VII wherein the symbol X represents halogen and wherein the symbols $R_6$ and $R_7$ are alkyl groups having from 1 to 6 carbon atoms and $R_5$ has the same meaning as in Formula IV.

The quaternary compound of Formula VII, while dissolved in a suitable solvent, is subsequently reduced with hydrogen in the presence, for example, of platinum oxide and potassium acetate to yield a compound having the formula

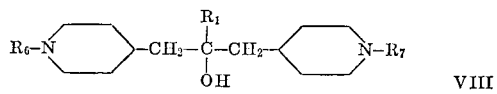   VIII in which the symbols $R_6$ and $R_7$ are alkyl groups having from 1 to 6 carbon atoms and $R_1$ has the same meaning as in Formula I.

The compound of Formula VIII can be obtained also by the alkylation of the corresponding compound in which the symbols $R_6$ and $R_7$ represent hydrogen atoms. Thereafter, the compound of Formula VIII is dehydrated in the same manner described previously for the dehydration of the compound of Formula V to yield a compound having the formula

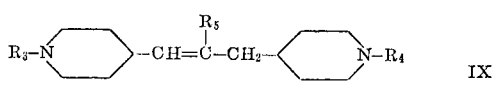   IX wherein the symbols $R_3$ and $R_4$ each represent alkyl groups having from 1 to 6 carbon atoms and in which $R_5$ has the same meaning as in Formula IV.

Compounds of Formula V and IX are mixtures of stereoisomers and these isomers can be separated, if desired, by conventional methods. Upon hydrogenation of the compound of Formula IX, while dissolved in water and glacial acetic acid in the presence of platinum, there is obtained a compound of Formula I in which $R_3$ represents an alkyl group having from 1 to 6 carbon atoms; $R_4$ represents an alkyl group having from 1 to 6 carbon atoms; and $R_2$ represents hydrogen.

In still another preparative method, the compounds of Formula I, in which $R_2$ is hydrogen, $R_3$ is hydrogen and $R_4$ is hydrogen, are prepared by the following sequence of reactions:

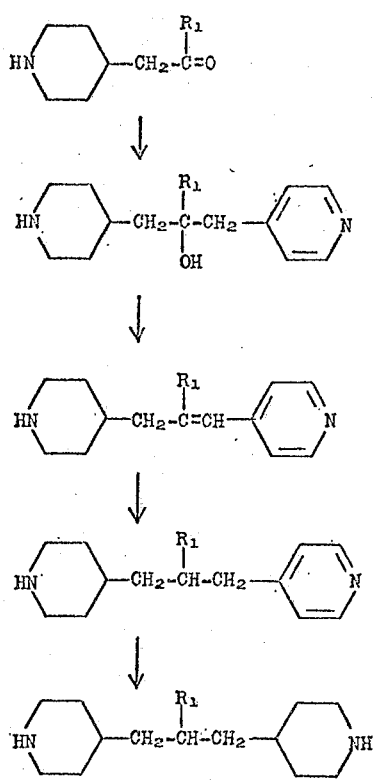

in each of Formulas (a) to (e), inclusive, the symbol $R_1$ has the same meaning as in Formula I.

The compounds of Formulas (b) to (d), inclusive, are novel compounds and, in addition to being intermediates for the production of the pharmacologically active compounds of Formula (e), are, in and of themselves, pharmacologically active.

Alternatively, the compound of Formula (d) can be converted, by appropriate means, into a compound of the formula

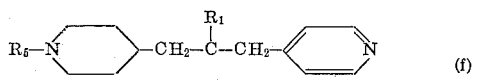

which, in turn, can be converted into a compound of the formula

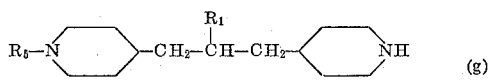

The compound of Formula (g) can, if desired, be converted into a compound of the formula

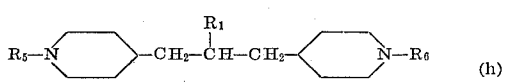

in each of which formulas $R_1$ has the same meaning as in Formula I and in each of which $R_5$ and $R_6$ represent alkyl groups; which formula, it will be appreciated, corresponds to Formula I in which $R_3$ and $R_4$ are alkyl groups.

In a further embodiment of the invention, the compound of Formula (b) can be converted directly to the compound of Formula I in which $R_2$ is a hydroxy group and in which $R_3$ and $R_4$ are hydrogen atoms. More specifically, the compounds of Formula (b) can be converted directly into compounds having the formula:

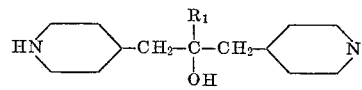

in which the symbol $R_1$ has the same meaning as in Formula I.

The piperidyl compounds of Formula (a) are prepared by the catalytic reduction of the corresponding pyridyl compound. Thus, for example, 4-phenacylpiperidine, a preferred starting material, is obtained by hydrogenating 4-phenacylpyridine, at elevated temperature and under pressure, in the presence of platinum catalyst.

In preparing the alcohols of Formula (b), the piperidyl compound of Formula (a) is reacted with a picolyl metal, preferably while dissolved in a suitable solvent. The procedure which is used in preparing the Formula (b) compounds is analogous to that described hereinafter for the preparation of the Formula IV alcohols.

The propenes of Formula (c) are obtained by the dehydration of the Formula (b) alcohols. In general, the dehydration procedure is conventional. It is carried out in a manner analogous to that, described heretofore, for the production of the propenes of Formula V. Preferably, the dehydration is effected by refluxing the alcohol of Formula (b) with a suitable mineral acid, such as, hydrochloric acid.

The propanes of Formula (d) are prepared by the catalytic hydrogenation of the propenes of Formula (c). In general, the hydrogenation procedure used will be analogous to that described heretofore for the conversion of the propenes of Formula V into the propanes of Formula VI. Preferably, however, the propene is hydrogenated, in ethanol, in the presence of a palladium on carbon catalyst.

The propanes of Formula (d) are converted to the propanes of Formula (e) by hydrogenation, in ethanol, in the presence of rhodium catalyst.

The direct conversion of the Formula (b) compound to the Formula I compound, in which $R_2$ is hydroxy and in which $R_3$ and $R_4$ are hydrogen atoms, is readily accomplished. Such conversion can be accomplished by hydrogenating the Formula (b) compound, while dissolved in dilute hydrochloric acid, in the presence of platinum catalyst at atmospheric pressure and at a temperature of about 25° C. The use of other reaction conditions will, however, be readily apparent to persons skilled in the art.

The compounds of Formula (d) can be converted into the compounds of Formula (f) by a conventional alkylation procedure. For example, the compound of Formula (d) can be converted to the compound of Formula (f) in which $R_5$ is methyl by reacting said compound, dissolved in formic acid with formaldehyde. The compound, thus obtained, can be converted into the correspondingly substituted compound of Formula (g) by hydrogenating said compound, in the presence of platinum catalyst, at atmospheric pressure and at about room temperature. The compound of Formula (g) in which $R_5$ is a methyl group can be alkylated to provide the compound of Formula (h). For example, the compound of Formula (g) in which $R_5$ is a methyl group can be converted to the compound of Formula (h) in which $R_3$ is a methyl group by reacting said Formula (g) compound, while dissolved in formic acid with formaldehyde.

The starting alcohols of Formula IV are readily prepared. For the purposes of illustration, alternate processes will be described herein for producing the starting alcohols. It should be fully understood, however, that neither the alcohols, nor the processes for producing same, are part of this invention. In general, the alcohols of Formula IV are conveniently prepared by reacting a 4-picolyl metal compound having the formula

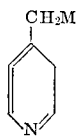

in which the symbol M represents an alkali metal, such as, sodium, potassium or lithium, either with an acid halide having the formula $$R_5CO\text{-}Hal \qquad XI$$

in which the symbol $R_5$ has the same meaning as in Formula IV and in which Hal represents a holgen atom, or with an ester having the formula $$R_5COOX \qquad XII$$

in which the symbol $R_5$ has the same meaning as in Formula IV and in which the symbol X represents an alkyl, phenyl or benzyl radical.

More specifically, the alcohols of Formula IV are prepared by reacting a 4-picolyl metal compound of Formula X with an acid halide of Formula XI, such as, benzoyl chloride; a halogen-substituted benzoyl chloride, for example, 3-fluorobenzoyl chloride, 4-fluorobenzoyl chloride, 4-chlorobenzoyl chloride etc.; a lower alkyl-substituted benzoyl chloride, for example, p-toluoyl chloride; a lower alkoxy-substituted benzoyl chloride, for example, methoxybenzoyl chloride; a lower alkylmercapto-substituted benzoyl chloride, for example, methylmercaptobenzoyl chloride; acetyl chloride; isobutyryl chloride; octanoyl chloride; 10-undecenoyl chloride; phenacetyl chloride; a cycloalkyl carboxylic acid halide, for example, cyclopropyl carboxylic acid chloride, cyclobutyl carboxylic acid chloride, cyclopentyl carboxylic acid chloride, cyclohexyl carboxylic acid chloride; cycloheptyl carboxylic acid chloride, cyclooctyl carboxylic acid chloride; a halide of a 5- or 6-member heterocyclic carboxylic acid, for example, a halide of a pyridine carboxylic acid, such as, a chloride of 2-pyridine carboxylic acid, a chloride of 4-pyridine carboxylic acid; a halide of a furoic acid, such as, a chloride of 2-furoic acid; a halide of thiophene carboxylic acid, such as, a chloride of 2-thiophene carboxylic acid; a halide of a pyrrol carboxylic acid, such as, a chloride of 2-pyrrol carboxylic acid; or a halide of a lower alkyl-substituted derivative of such 5- or 6-member carboxylic acids. Obviously, halides of the named compounds, other than chlorides can be used.

In the alternate process for producing the starting materials of Formula IV, the 4-picolyl metal compound of Formula X is reacted with an ester of Formula XII, such as, an alkyl ester of benzoic acid, for example, methyl benzoate, ethyl benzoate, etc.; an alkyl ester of an alkyl-substituted benzoic acid, for example, the methyl ester of toluic acid, the ethyl ester of toluic acid; an alkyl ester of a halogen-substituted benzoic acid, for example, methyl chlorobenzoate, ethyl chlorobenzoate, methyl fluorobenzoate, ethyl fluorobenzoate, etc.; benzylbenzoate; a benzyl ester of an alkyl-substituted benzoic acid, for example, the benzyl ester of toluic acid; a benzyl ester of a halogenated benzoic acid, for example, benzyl chlorobenzoate, benzyl fluorobenzoate; an alkyl ester of a lower alkoxy-substituted benzoic acid, for example, the methyl ester of methoxy-substituted benzoic acid; an alkyl ester of an alkylmercapto-substituted benzoic acid, for example, the methyl ester of methylmercapto benzoic acid; a benzyl ester of an alkoxy-substituted benzoic acid, for example, the benzyl ester of methoxy-substituted benzoic acid; a benzyl ester of a lower alkylmercapto-substituted benzoic acid, for example, the benzyl ester of methylmercapto benzoic acid; an alkyl ester, such as, a methyl, ethyl, propyl, butyl, etc. ester, of, for example, acetic acid, isobutynic acid, octaonic acid, 10-undecenoic acid or a benzyl or phenyl ester of such an acid; an alkyl ester of a cycloalkyl carboxylic acid, for example, the methyl, ethyl, butyl, etc. esters of cyclopropyl carboxylic acid, cyclobutyl carboxylic acid, cyclopentyl carboxylic acid, cyclohexyl carboxylic acid or a phenyl or benzyl ester of such cycloalkyl carboxylic acid; an alkyl ester, for example, a methyl, ethyl, propyl, butyl, etc. ester of 5- or 6-member heterocyclic acid, such as, 2-pyridine carboxylic acid, 4-pyridine carboxylic acid, 2-furoic acid, 2-thiophene carboxylic acid, or a phenyl or benzyl ester of such a heterocyclic carboxylic acid.

The reaction of the 4-picolyl metal compound of Formula X with either the Formula XI compound or the Formula XII compound to produce the Formula IV starting material is carried out preferably in an inert solvent, for example, benzene, diethyl ether, toluene, 4-picoline, tetrahydrofuran, at a temperature within the range of from about $-10°$ C. to about $-60°$ C. In carrying out such reaction, there is used, preferably, a ratio of at least about 2.0 moles of the 4-picolyl metal compound of Formula X for each mole of the Formula XI or XII compound employed. Obviously, however, a larger or smaller quantity of the 4-picolyl metal compound can be used in the reaction, if desired. The reaction product of Formula IV, the starting material used herein, can be isolated from the reaction mixture and, if desired, purified by any conventional procedure.

The compounds of this invention exhibit useful and entirely unexpected pharmacological activity. For example, in varying degrees, the compounds antagonize tetrabenazine ptosis in mice; potentiate DOPA, i.e., dihydroxy phenylalanine, excitation in mice; potentiate amphetamine excitation in behavior studies in rats; potentiate cocaine excitation in rats; potentiate low doses of tetrabenazine excitation in rats; and potentiate norepinephrine pressor effects in dogs. The compounds are, accordingly, useful as antidepressants.

The manner in which the present compounds are used as medicaments will be readily apparent to persons skilled in the art. In general, the pharmacologically active compounds are formulated, together with conventional inert adjuvants, either inorganic or organic in nature, into dosage forms suitable for oral or parenteral administration. Such adjuvants include, for example, water, gelatin, lactose, starch, magnesium stearate, talc, vegetable oils, gums, polyalkylene glycols, etc. Moreover, the products can be sterilized and/or mixed with, for example, preservatives, stabilizers, wetting or emulsifying agents, salts for altering osmotic pressure, buffers, etc. The dosage forms into which the present compounds can be formulated include tablets, capsules, suspensions, solutions, etc. The frequency of administration of the various dosage forms is variable depending to a large extent on the type of dosage form, and the potency thereof, in use and on the needs and requirements of the patient.

For a fuller understanding of the nature and objects of this invention, reference may be had to the following examples which are given merely as further illustrations of the invention and are not to be construed in a limiting sense.

EXAMPLE 1

(A) In this example, 50 grams (172.3 millimoles) of 2-phenyl-1,3-di(4-pridyl)-2-propanol was dissolved in 600 ml. of 3 N hydrochloric acid. This solution was reacted with hydrogen, at a temperature of 55° to 60° C. under 60 atmospheres of pressure, in the presence of 5 grams of platinum as the hydrogenation catalyst. When the hydrogenation was completed, a clear colorless solution was obtained. This solution was filtered to remove therefrom the platinum catalyst, following which the filtrate was cooled with 1 kg. of ice and made strongly alkaline using 10 N sodium hydroxide solution. An oil was deposited by the last step and this oil was extracted four times, using 200 ml. of methylene chloride each time. The methylene chloride extracts were combined and, thereafter, washed with water, two times, using 100 ml. of water each time. Subsequently, the methylene chloride extracts were washed again, two times, using 100 ml. of brine each time. The washed extracts were then dried over anhydrous sodium sulfate and concentrated in vacuo to an oil.

A substantial portion of the oily residue, which was obtained in the concentration step, was dissolved in 150 ml. of isopropyl alcohol and 70 ml. of a solution of hydrogen chloride in isopropyl alcohol was added thereto. The resulting solution was cooled in an ice bath to form a crystalline product. The crystalline product was separated by filtration, washed with 100 ml. of a mixture of isopropanol-ether (1:1) and dried. The product, namely, 2-phenyl-1,3-di(4-piperidyl)propane dihydrochloride hydrate was obtained in the form of colorless needles melting at 170° to 175° C.

The remainder of the oily residue obtained upon extraction of the reaction mixture with methylene chloride and its subsequent concentration in vacuo was distilled at 176° C./0.5 mm. Upon cooling, the distillate crystallized. The crystals, thus obtained, were recrystallized from hexane to yield the pure base, that is, 2-phenyl-1,3-di(4-piperidyl)propane as colorless prisms melting at 69°–72° C.

To 4 grams (0.014 mole) of 2-phenyl-1,3-di(4-piperidyl)propane, there was added 90 ml. of isopropanol and 2.9 grams (0.029 mole) of concentrated sulfuric acid. After 30 minutes, the solution was filtered and the 2-phenyl-1,3-di(4-piperidyl)propane disulfate salt was recrystallized twice from a methanol-ether mixture (1:1) to give colorless prisms melting at 222–235° C.

To 4 grams (0.014 mole) of 2-phenyl-1,3-di(4-piperidyl)propane, there was added 100 ml. of methanol and 3.4 grams (0.029 mole) of 85% phosphoric acid. After stirring for one hour, 50 ml. of ether was added. The 2-phenyl-1,3-di(4-piperidyl)propane diphosphate salt was obtained by filtration and it was recrystallized twice from a mixture of 15 ml. of warm water and 15 ml. of ethanol to give colorless rods melting at 217–231° C.

To a solution of 5.0 grams (17.44 millimole) of 2-phenyl-1,3-di(4-piperidyl)propane in 15 ml. of ethanol, there was added a hot solution of 6.06 grams (52.2 millimole) of maleic acid in 15 ml. of ethanol. Upon the slow addition of 200 ml. of ethyl ether, the 2-phenyl-1,3-di(4-piperidyl)propane dimaleate salt precipitated as colorless prisms, M.P. 160–171° C.

(B) A mixture of 5.0 grams (0.0174 mole) of 1,3-di(4-piperidyl)-2-phenylpropane, produced as described in section A hereof, 4.5 grams (0.088 mole) of 90% formic acid and 1.1 gram (0.0387 mole) of 37.5% formaldehyde was refluxed for a period of fifteen hours. At the end of that time 5 ml. of hydrochloric acid was added, following which the mixture was evaporated almost to dryness under reduced pressure. The solution was made alkaline using 10 N sodium hydroxide and, thereafter, extracted two times using 50 ml. of ether each time. The ether extracts were combined, washed with 40 ml. of saturated brine, dried over anhydrous sodium sulfate and taken down to dryness.

The colorless oil which was thus obtained was crystallized from ether to yield 1,3-bis(1-methyl-4-piperidyl)-2-phenylpropane in the form of white rods melting at a temperature of 96° to 97° C.

For the sake of completeness, the preparation of the 2-phenyl-1,3-di(4-pyridyl)-2-propanol starting material is set forth hereinafter although it should be understood that neither the compound itself nor the process for its preparation comprises a part of the instant invention.

An ether-benzene solution of 1.89 liters containing 3.5 moles of phenyl lithium was added, over a 3½ hour period, to a stirring solution of 326 grams of 4-picoline (3.5 moles) in 800 ml. of tetrahydrofuran. This addition was carried out in an atmosphere of dry nitrogen. When the addition of the phenyl lithium solution to the 4-picoline solution was completed, the reaction mixture was stirred for an additional 15 minutes. The reaction mixture was then cooled to a temperature of about −20° C. There was thus produced picolyl lithium.

A mixture of 197 grams of benzoyl chloride (1.4 mole) and 100 ml. of tetrahydrofuran was added to the picolyl lithium solution, produced as described in the preceding paragraph, over a fifty-minute period. During this addition, the temperature of the reaction mixture was maintained at about −20° C. A pale green colored reaction mixture was obtained and it was stirred at a temperature of about −20° C. for a period of about sixty minutes. Thereafter, the reaction mixture was brought to about room temperature, at which temperature the mixture was stirred for a period of about sixty minutes. Subsequently, 100 ml. of water was added to the reaction mixture in a dropwise manner. The reaction mixture was then diluted with 1 liter of water, stirred vigorously and transferred to a separatory funnel. In this vessel, the reaction mixture was acidified using 800 ml. of 6 N hydrochloric acid. The acid layer was separated from the organic phase and the latter was extracted two times, using 200 ml. of 3 N hydrochloric acid each time. The acid extracts were combined, washed first three times using 500 ml. of toluene each time, and, subsequently, one time using 500 ml. of ether. Subsequently, 5 kg. of ice was added to the acid extracts which were then made alkaline using ammonium hydroxide. During this step, the acid extracts were maintained at a temperature of about 10° C.

Treatment of the acid extracts with alkali, as described in the preceding paragraph, resulted in the formation of a precipitate. This precipitate was recovered by filtration, following which it was washed five times using 1.0 liter of water each time. The precipitate was then partitioned between 400 ml. of methylene chloride and 600 ml. of water and the mixture was thoroughly shaken. The insoluble residue was removed by filtration and washed two times using 200 ml. of water each time. Thereafter, the residue was washed two times using 200 ml. of methylene chloride each time and one time using 200 ml. of ether. The product was then dried in a vacuum oven at a temperature of 50° C. (20″ Hg) for a period of about 15 hours. There was obtained by this procedure, 2-phenyl-1,3-di(4-pyridyl)-2-propanol melting first at 92° to 99° C., resolidifying and melting again at 166° to 168° C.

EXAMPLE 2

This example is included herein to show an alternate preparative method for 2-phenyl-1,3-di(4-piperidyl)propane dihydrochloride monohydrate and to demonstrate a procedure for obtaining 2-cyclohexyl-1,3-di(4-piperidyl) propane.

In this example, 100 grams (0.344 mole) of 2-phenyl-1,3-di(4-pyridyl)-2-propanol, produced as described in Example 1, was dissolved in 500 ml. of 75 percent sulfuric acid. This solution was heated at a temperature of 100° C. for a period of about 2 hours. At the end of that period of time, the reaction mixture was cooled in an ice bath for about 10 minutes, following which it was poured into a mixture of ice and ammonium hydroxide. An oil was deposited in the latter step and this oil was extracted from the alkaline aqueous phase, five times, using 500 ml. of ether each time. The combined ether extracts were subsequently washed three times using 100 ml. of water each time and two times using 100 ml. of brine each time. Thereafter the washed ether extracts were dried over anhydrous sodium sulfate and concentrated in vacuo to an oil. There was thus obtained a mixture of the cis and trans isomers of 1,3-di(4-pyridyl)-2-phenyl-1-propene. This mixture was subsequently dissolved in 1 liter of 3 N hydrochloric acid and hydrogenated at a temperature of from about 50° to 55° C., under 60 atmospheres of pressure, in the presence of 5.0 grams of platinum as the hydrogenation catalyst. After the required amount of hydrogen had been absorbed, the catalyst was removed by filtration to yield a clear colorless solution. This solution was poured into a mixture of 600 ml. of 10 N sodium hydroxide and 1 kg. of ice and the mixture was extracted, five times, using 500 ml. of ether each time. The ether extracts were combined, washed, three times, using 200 ml. of water each time and one time using 100 ml. of brine. The washed ether extracts were subsequently dried over anhydrous sodium sulfate, filtered and concentrated in vacuo to an oil which crystallized upon standing.

The crystalline product, which thus obtained, comprising essentially 2 - phenyl - 1,3 - di(4 - piperidyl)propane, was dissolved in 500 ml. of isopropyl alcohol. Thereafter, 128 ml. of a solution of hydrogen chloride in isopropyl alcohol was added to that solution. Subsequently, 1 liter of ether was added to the mixture, following which the mixture was cooled in an ice bath. The product, thus formed, was recovered from the mother liquor by filtration and recrystallized from a mixture of 500 ml. of methanol and 1 liter of ether to yield 2-phenyl-1,3-di(4-piperidyl)propane dihydrochloride monohydrate melting at 170° to 175° C.

The mother liquor from the preceding step was concentrated and crystallized from a methanol-ether mixture to give 2 - cyclohexyl - 1,3 - di(4 - piperidyl)propane, in the form of its dihydrochloride salt, melting at 240° to 250° C. with decomposition. The salt was dissolved in water and the solution made alkaline with sodium carbonate. The aqueous solution was extracted with methylene chloride, following which the extracts were dried and evaporated to dryness. This residue, crystallized from hexane, yielded 2 - cyclohexyl - 1,3 - di(4 - piperidyl) propane in the form of colorless prisms, melting at 78° to 80° C.

EXAMPLE 3

This example is included herein to demonstrate an additional method for preparing 2-phenyl-1,3-di(4-piperidyl)propane.

In this example, 5.3 grams (19.3 millimole) of 2-phenyl-1,3-di(4-pyridyl)propane was dissolved in 200 ml. of ethanol. This solution was treated with 100 atmospheres of hydrogen at a temperature of 96° C. in the presence of about 1.0 gram rhodium as the hydrogenation catalyst. The bomb was washed with ethanol, following which the catalyst was removed by filtration. Concentration of the filtrate in vacuo yielded 5.40 grams of a colorless oil which, on standing, formed a crystalline mass. This crystalline mass, recrystallized from hexane, yielded 2-phenyl-1,3-di(4-piperidyl)propane in the form of colorless needles melting at 70° to 72° C. Upon treatment of this compound with dry hydrogen chloride in isopropyl alcohol, there was obtained the corresponding dihydrochloride hydrate salt, in the form of colorless needles, melting at 170° to 175° C. with decomposition.

For the sake of completeness, the preparation of 2-phenyl-1,3-di(4-pyridyl)propane starting material is set forth hereinafter although it should be understood that neither the compound itself nor the process for its preparation comprises part of this invention. A solution of 10.0 grams (37 millimoles) of a 1:1 mixture of cis 1,3-di(4-pyridyl)-2-phenyl-1-propene and trans 1,3-di(4-pyridyl)-2-phenyl-1-propene in 250 ml. of ethyl acetate was first prepared. The isomeric mixture used was prepared as described in Example 2. To this solution there was added 1.0 gram of 10 percent palladium on charcoal. The product was, thereafter, hydrogenated at a temperature of about 25° C. at atmospheric pressure. Over a period of about 72 hours, one molar equivalent of hydrogen was absorbed. At the end of that period of time, the catalyst was removed by filtration, following which the filtrate was concentrated in vacuo to yield 2-phenyl-1,3-di(4-pyridyl)propane, in the form of crystals, melting at 45° to 60° C. Recrystallization of the compound from ether-hexane yielded the product in the form of colorless prisms melting at 53° to 60° C.

EXAMPLE 4

In this example, there was first prepared a solution of 5.0 grams (17 millimoles) of 2-cyclohexyl-1,3-di(4-pyridyl)-2-propanol in 70 ml. of a 75 percent by volume solution of concentrated sulfuric acid in water. This solution was stirred for a period of about 45 minutes at a temperature of about 100° C. At the end of that period of time, the reaction mixture was poured into a mixture of ice and concentrated ammonium hydroxide. The alkaline solution was thereafter extracted three times with ether, dried over magnesium sulfate and filtered through alumina (Woelm, neutral, activity grade 1). Removal of the solvent, in vacuo, yielded 2-cyclohexyl-1,3-di(4-pyridyl)propene as a colorless oil. This oil was dissolved, thereafter, in 200 ml. of ethanol and treated with 100 atmospheres of hydrogen at a temperature of 92° C. in the presence of 1.0 gram of rhodium as a hydrogenation catalyst. When the hydrogenation was completed, the catalyst was removed by filtration. The filtrate was, subsequently, concentrated in vacuo to yield 2-cyclohexyl-1,3-di(4-piperidyl)propane as a mass of colorless waxy plates melting at 74° to 80° C.

For the sake of completeness, the preparation of the 2-cyclohexyl - 1,3 - di(4 - pyridyl) - 2 - propanol starting material is set forth hereinafter although it should be understood that neither the compound itself nor the process for its preparation comprises part of this invention.

A solution of 23.9 grams (0.2 mole) of hexahydrobenzoyl chloride in 75 ml. of anhydrous tetrahydrofuran was added slowly over a period of about 30 minutes to a solution of 0.5 mole of 4-picolyl lithium in 200 ml. of tetrahydrofuran. During such addition, the latter solution was maintained at a temperature of about −20° C. When the addition was completed, the reaction mixture was stirred at a temperature of −20° C. for a period of about thirty minutes, following which it was stirred at room temperature for a period of about two hours. At the end of that period of time, 1.0 liter of water was added to the reaction mixture. The resulting solution was acidified using 3 N hydrochloric acid. A two-layer system was formed. These layers were separated and the organic base was extracted two times using 200 ml. of hydrochloric acid each time. The acid extracts were combined, washed three times using 200 ml. of ether each time, and made alkaline with 10.0 N sodium hydroxide solution. The alkaline solution was allowed to stand at room temperature overnight and as a result thereof a precipitate formed. The precipitate was removed by filtration, washed, first, five times using 100 ml. of water each time, and thereafter, three times using 100 ml. of ether each time. The precipitate was recrystallized from an acetone-hexane mixture to yield 2 - cyclohexyl - 1,3 - di(4 - pyridyl) - 2-propanol, as colorless prisms melting at 176° to 178° C.

EXAMPLE 5

In this example, a solution of 13.4 grams (46.2 millimoles) of a mixture of the cis and trans isomers of 2-(2-fluorophenyl) - 1,3 - di(4 - pyridyl) - 1 - propene in 200 ml. of ethanol was treated with hydrogen at 100 atmospheres of pressure and at a temperature of 100° C. in the presence of 1.0 gram of rhodium. The bomb was washed with ethanol and the catalyst was removed by filtration. The reaction mixture was concentrated in vacuo to yield a colorless oil which crystallized slowly to yield 2(o-fluorophenyl) - 1,3 - di(4 - piperidyl)propane in the form of waxy prisms melting at 62° to 72.5° C. Treatment of this product with dry hydrogen chloride in isopropyl alcohol yielded 2 - (o - fluorophenyl) - 1,3 - di(4-piperidyl)-propane dihydrochloride hemihydrate melting at 164° to 168° C. with decomposition. Recrystallization of this product from an isopropyl alcohol-hexane mixture gave the pure hydrated salt, in the form of colorless needles, melting at 169° C. to 171° C., with decomposition.

For the sake of completeness, the preparation of the 2 - (2 - fluorophenyl) - 1,3 - di(4 - pyridyl) - 1 - propene starting material is set forth hereinafter although it should be understood that neither the compound itself nor the process for its preparation comprises part of this invention.

A solution of 9.5 grams (30.8 millimoles) of 2-(2-fluorophenyl) - 1,3 - di(4 - pyridyl) - 2 - propanol in 75 ml. of sulfuric acid (75%) was first prepared. This solution was stirred for a period of four hours at a temperature of about 85° C. Thereafter, the cooled reaction mixture was poured into 400 ml. of concentrated ammonium hydroxide and 1 kg. of ice. The mixture was then extracted with 150 ml. of ether, following which the extracts were concentrated in vacuo. There was, thus obtained, an oily mixture of the cis and trans 2-(2-fluorophenyl) - 1,3 - di(4 - pyridyl) - 1 - propene. Crystallization from hexane yielded cis 2 - (2 - fluorophenyl)-1,3-di(4 - pyridyl) - 1 - propene in the form of colorless needles melting at 105° to 107° C. Concentration of the hexane mother liquor yielded the trans 2 - (fluorophenyl)-1,3 - di(4 - pyridyl) - 1 - propene in the form of light yellow prisms melting at 88° to 90° C.

The 2 - (2 - fluorophenyl) - 1,3 - di(4 - pyridyl)-2-propanol starting material was prepared by reacting 4-picolyl lithium with 2-fluorobenzoyl chloride, the process being carried out in the same manner as described in Example 1 for the production of 2 - phenyl - 1,3 - di(4-pyridyl)-2-propanol.

EXAMPLE 6

In this example, 8.5 grams (0.0282 mole) of 2-methyl-1,3-di(4-pyridyl)propane dissolved in 150 ml. of 3 N hydrochloric acid was reduced with hydrogen in the presence of 0.2 gram of platinum. The hydrogenation was carried out at a pressure of 60 atmospheres and at a temperature within the range of from about 55° to 65° C. The reaction was continued until seven molar equivalents of hydrogen had been absorbed. When the reaction was completed, the reaction mixture was filtered to remove the platinum catalyst. Subsequently, the filtrate was made strongly alkaline using 10 N sodium hydroxide solution and extracted three times using 100 ml. of methylene chloride each time. The methylene chloride extracts were collected and combined following which the extracts were washed three times using 25 ml. of water each time, dried over anhydrous sodium sulfate, filtered and concentrated. There was obtained in the form of an oil, 2-methyl-1,3-di(4-piperidyl)propane. This base was dissolved in a small amount of isopropanol and the solution was saturated with hydrogen chloride. The reaction mixture was filtered and the solid product thus obtained recrystallized from isopropanol to give 2 - methyl - 1,3 - di(4 - piperidyl)propane dihydrochloride in the form of white prisms melting at 291° to 298° C. with decomposition.

For the sake of completeness, the preparation of the 2-methyl-1,3-di(4-pyridyl)propane starting material is set forth hereinafter although it should be understood that neither the compound itself nor the process for its preparation comprises a part of the instant invention.

A solution of 0.5 mole of 4-picolyl lithium in tetrahydrofuran was first prepared. This solution was brought to a temperature within the range of from about −30° to −50° C. To this cooled solution there was added, under an atmosphere of dry nitrogen, 0.2 mole of acetyl chloride dissolved in 150 ml. of tetrahydrofuran. This addition was effected in a dropwise fashion over a period of about sixty minutes. Thereafter, the reaction mixture was stirred overnight, following which it was diluted with 100 ml. of water. The reaction mixture was then extracted three times using 150 ml. of 6 N hydrochloric acid each time. The acid extracts were then stirred into a mixture of 500 grams of ice and 300 ml. of concentrated ammonium hydroxide with the temperature being maintained at about 0° C.

The clear solution, obtained as described in the preceding paragraph, was thereafter extracted three times using 150 ml. of methylene chloride each time. The organic extracts were combined, dried over magnesium sulfate and reduced, in vacuo, to an oil. Trituration with hexane yielded 2-methyl - 1,3 - di(4-pyridyl) - 2 - propanol as yellow crystals melting at 120° to 125° C. Recrystallization of the product three times from an acetone-hexane mixture yielded the compound, in the form of colorless blocks, melting at 127° to 128° C.

A solution of 10.0 grams (0.0437 mole) of 2-methyl-1,3 - di(4 - pyridyl) - 2 - propanol in 50 ml. of sulfuric acid (70%) was prepared and stirred for a period of twenty-two hours at a temperature of about 75° C. The solution, at the end of that period of time, was cooled in an ice-bath, made alkaline with ammonium hydroxide and extracted two times, using 100 ml. of methylene dichloride each time. The organic layers were then combined, washed with 75 ml. of saturated brine, dried over sodium sulfate and concentrated. The residual oil containing 2 - methyl - 1,3 - di(4 - pyridyl) - 1 - propene was dissolved in benzene and chromatographed on 70 grams of alumina (neutral grade 1). It was eluted with 200 ml. of benzene, 200 ml. of methylene dichloride and 200 ml. of methanol.

Fractions 1 and 2 were combined and dissolved in 50 ml. of methanol. The solution was, thereafter, saturated with hydrogen chloride, following which 100 ml. of ether was added thereto. The salt which precipitated from solution was recovered by filtration. Recrystallization of the precipitate from a methanol-ether mixture containing a trace of water yielded 2 - methyl - 1,3 - di(4 - pyridyl)-1-propene dihydrochloride hydrate in the form of white rods, melting at 181° to 186° C.

A solution of 15.0 grams (71.5 millimoles) of 2-methyl-1,3 - di(4 - pyridyl) - 1 - propene, produced as described in the preceding paragraphs was dissolved in 300 ml. of ethyl acetate. To this solution there was added 1.0 gram of 10% palladium on carbon catalyst. The compound was, thereafter, hydrogenated at atmospheric pressure and room temperature. The reaction mixture absorbed the required amount of hydrogen, i.e. one molar equivalent in a period of about six hours. At the end of that period, the catalyst was separated from the reaction mixture by filtration, following which the filtrate was concentrated to an oil under reduced pressure. The residue was then dissolved in 200 ml. of anhydrous ether and saturated with hydrogen chloride. The precipitated oil crystallized upon the addition of a small amount of methanol. Recrystallization of the product from a methanol-ether mixture yielded 2 - methyl - 1,3 - di(4 - pyridyl)propane dihydrochloride as colorless prisms melting at 223° to 245° C.

EXAMPLE 7

In this example, 5.0 grams (17.3 millimoles) of 1,3-di(4 - pyridyl) - 2 - (p-tolyl)propane dissolved in 200 ml. of ethanol was reduced with hydrogen at 100 atmospheres of pressure and at a temperature of 95° C. in the presence of 1.0 gram of rhodium. When the reaction was completed, the bomb was washed with ethanol and the rhodium catalyst was removed by filtration. Thereafter the solvent was removed from the filtrate in vacuo to yield 1,3 - di(4-piperidyl) - 2 - (p-tolyl)propane in the form of colorless crystals melting at 104–107° C. Recrystallization of the compound from hexane yielded the pure product in the form of colorless prisms melting at 106° to 108° C.

For the sake of completeness, the preparation of the 1,3 - di(4-pyridyl) - 2 - (p-tolyl)propane starting material is set forth hereinafter although it should be understood that neither the compound itself nor the process for its preparation comprises part of this invention.

A solution of 5.0 grams (16.5 millimoles) of 1,3-di(4-pyridyl - 2 - (p-tolyl)-2-propanol in 50 ml. of sulfuric acid (75 percent) was first prepared. This solution was stirred at a temperature of 75° C. for a period of about eighteen hours. At the end of that period of time the reaction mixture was poured into 250 ml. of concentrated ammonium hydroxide and 500 grams of ice. The mixture was, thereafter, extracted with 150 ml. of ether, following which the ether extracts were dried over magnesium sulfate and concentrated in vacuo. There was, thus obtained, a mixture of the cis and trans isomers of 1,3-di(4 - pyridyl) - 2 - (p-tolyl) - 1 - propene in the form of an oil. On standing, this oil solidified, melting point at 100° to 118° C. Recrystallization of the solid product from hexane yielded the pure cis 1,3-di(4-pyridyl)-2-(p-tolyl)-1-propene, melting at 116° to 117.5° C.

In this example, a solution of 1.3 grams (4.54 millimoles) of cis 1,3-di(4-pyridyl) - 2 - (p-tolyl)-1-propene, produced as described in the preceding paragraph in 200 ml. of ethyl acetate was first prepared. To this solution there was added 250 mg. of 10 percent palladium on carbon as a catalyst. The product was then hydrogenated at room temperature and atmospheric pressure. Over a period of about four hours, one molar equivalent of hydrogen was absorbed. Thereafter, the catalyst was removed by filtration and the solvent was removed, under reduced pressure, to give 1.3 grams of oil. Recrystallization from hexane-ether yielded 1,3-di(4-pyridyl)-2-(p-tolyl)propane melting at 94° to 96° C.

The starting 1,3 - di(4 - pyridyl) - 2 - (p-tolyl)-2-propanol was prepared by the reaction of p-toluoyl chloride with 4-picolyl lithium, the said process being carried out in the same manner as described in Example 1 for the production of 2-phenyl-1,3-di(4-pyridyl)-2-propanol.

EXAMPLE 8

In this example, 20 grams of 2 - phenyl - 1,3-di(4-pyridyl)-2-propanol, produced as described in Example 1, was treated with an excess of methyl iodide and allowed to stand at room temperature for a period of eighteen hours. The reaction mixture was thereafter filtered and the product, thus obtained, recrystallized from isopropanol to yield 2-phenyl-1,3-di(4-pyridyl)-2-propanol dimethiodide, melting at 189° to 191° C.

The quaternary compound (30 grams), which was prepared as described in the preceding paragraph, was dissolved in 200 ml. of ethanol and hydrogenated for a period of about eight hours at 35 atmospheres of pressure and room temperature in the presence of 1.0 gram of platinum oxide and 10.0 grams of potassium acetate. The catalyst was then removed by filtration and the filtrate was concentrated under reduced pressure. The residue was, thereafter, partitioned between 150 ml. of ether and 15 ml. of water. The aqueous layer was made basic with ammonium hydroxide and extracted three times, using 100 ml. of ether each time. The ether layers were combined, washed three times, using 100 ml. of water each time, dried over anhydrous sodium sulfate, filtered and evaporated. Crystallization and recrystallization of the residue from cyclohexane gave 1,3-bis(1-methyl-4-piperidyl)-2-phenyl-2-propanol, melting at 119° to 121° C.

A solution of 8.1 grams (0.0247 mole) of 1,3-bis-(1-methyl - 4 - piperidyl) - 2 - phenyl - 2 - propanol in 100 ml. of concentrated hydrochloric acid was refluxed for a period of fifteen hours. At the end of that period of time, the reaction mixture was cooled in an ice bath, made alkaline with 10 N sodium hydroxide and extracted two times using 100 ml. of ether each time. The organic layers were combined, washed with 75 ml. of saturated brine solution and dried over anhydrous sodium sulfate. Subsequently, the solution was evaporated to dryness. The residue was dissolved in 40 ml. of petroleum ether and chromatographed on 100 grams of basic alumina. The column was eluted with 100 ml. of benzene and 250 ml. of ether. The two fractions were combined and evaporated to dryness. There was obtained 1,3-bis(1-methyl-4-piperidyl)-2-phenylpropene in the form of a colorless oil. This base was dissolved in ethanol and cooled to a temperature of 5° C. Hydrogen chloride gas was then bubbled into the solution. Recrystallization of the salt which precipitated from an ethanol-ether mixture yielded 1,3 - bis(1-methyl-4-piperidyl)-2-phenylpropene dihydrochloride hydrate, as white needles, which melted at 270° C. to 275° C.

A solution of 0.1 gram (0.00323 mole) of 1,3-bis(1-methyl-4-piperidyl)-2-phenylpropene in 20 ml. of glacial acetic acid and 20 ml. of water was hydrogenated at room temperature and atmospheric pressure in the presence of 50 mg. of platinum. After the absorption of one molar equivalent of hydrogen, the solution was filtered through Celite, washed with water and made alkaline with 10 N sodium hydroxide. The solution was then extracted three times, using 40 ml. of ether each time. The organic layers were combined, washed with saturated brine solution, dried over anhydrous sodium sulfate and evaporated to dryness. Recrystallization of the residue from ether gave 1,3-bis(1-methyl-4-piperidyl) - 2 - phenylpropane, in the form of white rods melting at 96° to 97° C.

EXAMPLE 9

In this example, a mixture of 25.0 grams (86 millimoles) of 2-phenyl-1,3-di(4-pyridyl) - 2 - propanol, produced as described in Example 1, 1.0 gram of rhodium metal catalyst and 200 ml. of ethanol was treated with hydrogen at a temperature of 110° C. under 100 atmospheres of pressure. When the hydrogenation was completed, the catalyst was removed by filtration, following which the solvent was removed under reduced pressure. There was, thus obtained, a colorless oil which, on standing, solidified to a crystalline mass, melting at 64° to 72° C. This mass was refluxed in hexane giving 2 - phenyl - 1,3-di(4-piperidyl)-2-propanol, in the form of colorless prisms melting at 123° to 126° C.

EXAMPLE 10

A solution of 19.7 grams (0.10 mole) of 4-phenacylpyridine in a mixture of 200 ml. of ethanol and 9 ml. of concentrated hydrochloric acid was hydrogenated in the presence of 1.0 gram of platinum catalyst under 500 lbs. of pressure at 30° C. After the required amount of hydrogen had been absorbed, the catalyst was separated by filtration. The filtrate was then concentrated, in vacuo, to give 4-phenacylpiperidine hydrochloride which was recrystallized from methanol, as colorless prisms, M.P. 245° to 249° C. The 4-phenacylpiperidine free base was subsequently obtained by dissolving the salt in water, making the solution alkaline with dilute sodium hydroxide, extracting the free base, thus formed into dichloromethane, washing the dichloromethane layer with water, drying same over anhydrous sodium sulfate and concentrating same to an oil.

To a stirred solution of 0.88 mole of gamma picoline in 300 ml. tetrahydrofuran (purified by filtering over Woelm neutral alumina), under dry nitrogen, a solution of 0.88 mole of phenyl lithium in about 350 ml. of benzene and ether was added dropwise over a period of one hour. The reaction mixture was held at a temperature of 15° C. to 25° C. during the addition and was then stirred for a period of about thirty minutes at room temperature. The stirred solution was cooled to a temperature within the range of from about −20° to −30° C. and a solution of 4-phenacylpiperidine (0.352 mole) in 200 ml. of tetrahydrofuran was added dropwise over a twenty-five minute period. The reaction mixture was stirred at −20° to −25° C. for one hour, subsequently at room temperature for thirty minutes, following which it was hydrolyzed with 50 ml. of water. The reaction mixture was poured into 2 liters of water and acidified to pH 1 with concentrated hydrochloric acid. The acid layer was separated and the organic layer was further extracted with 200 ml. of 3 N hydrochloric acid. The acid extracts were combined, washed four times, using 300 ml. of ether each time, and made very strongly basic with 10 N sodium hydroxide solution.

The resulting precipitate was separated by filtration and washed thoroughly with water. Recrystallization from an acetone-ether mixture gave 2-phenyl-1-(4-piperidyl)-3-(4-pyridyl)-2-propanol as colorless rods melting at 125°–128° C.

A solution of 7.1 grams (24.9 millimole) of the 2-phenyl-1-(4-piperidyl) - 3 - (4-pyridyl)-2-propanol in 50 ml. of isopropanol was treated with 40 ml. of a 5.5 N solution of hydrogen chloride in isopropanol. The base was produced as described in the preceding paragraphs. The salt which was thus formed was precipitated as an oil with 200 ml. of ether and the supernatant solution was decanted. The residue was crystallized from a methanol-ether mixture to give 2-phenyl-1-(4-piperidyl)-3-(4-pyridyl)-2-propanol dihydrochloride monohydrate as colorless prisms melting at 168°–178° C., with decomposition.

EXAMPLE 11

(A) A solution of 90 grams (0.34 mole) of 2-phenyl-1-(4-piperidyl)-3-(4-pyridyl)-2-propanol produced as described in Example 10, and 1.0 liter of 9 N hydrochloric acid was refluxed for seventeen hours and poured into a mixture of 1.2 liter of 10 N sodium hydroxide solution and 500 grams of ice. The deposited oil was extracted with a 1:1 ether-benzene mixture, five times using 500 ml. of the ether-benzene mixture each time. The combined extracts were washed four times using 200 ml. of water each time, dried over anhydrous sodium sulfate, filtered, and concentrated in vacuo. The residue was dissolved in ethanol and one equivalent of a solution of maleic acid in ethanol was added. The salt which crystallized was removed by filtration and recrystallized from ethanol to give the pure cis-2-phenyl-3-(4-piperidyl)-1-(4-pyridyl) - 1 - propene maleate in the form of white prisms melting at 172°–178° C., with decomposition. Cis - 2 - phenyl-3-(4-piperidyl)-1-(4-pyridyl)-1-propene, as the free base, was obtained by dissolving the maleate salt in water, making the solution alkaline with dilute sodium hydroxide, extracting the free base, thus formed, into dichloromethane, washing the dichloromethane layer with water, drying same over anhydrous sodium sulfate and concentrating the solution.

(B) A solution of 8.0 grams (21.65 millimole) of 2-phenyl-1-(4-piperidyl)-3-(4-pyridyl)-2-propanol dihydrochloride monohydrate, produced as described in Example 10, in 150 ml. of water was hydrogenated in the presence of a platinum catalyst at atmospheric pressure and at a temperature of 25° C. After the required amount of hydrogen had been absorbed, the catalyst was separated by filtration over a small pad of "Hyflo." The filtrate was cooled with 100 grams of ice and made strongly alkaline with a 10 N sodium hydroxide solution. The deposited oil crystallized upon standing overnight and was recrystallized from hexane to give the product 1,3-di(4-piperidyl) - 2 - phenyl - 2 - propanol as colorless rods melting at 120°–124° C.

EXAMPLE 12

A solution of 2-phenyl-3-(4-piperidyl)-1-(4-pyridyl)-1-propene (55.5 millimole), produced as described in Example 11, in 200 ml. of ethanol was hydrogenated at a temperature of 45° to 50° C. under a pressure of 33.3 atmospheres in the presence of 5 grams of 10 percent palladium on carbon. After the required amount of hydrogen was absorbed, the catalyst was filtered and the filtrate was concentrated in vacuo. The residue was dissolved in 25 ml. of isopropanol and one equivalent of a 5.5 N solution of isopropanolic hydrogen chloride was added. The solution was cooled and the product crystallized by the slow addition of ether. Recrystallization from an isopropanol-ether mixture gave 2-phenyl-1-(4-piperidyl) - 3 - (4-pyridyl)propane hydrochloride as colorless prisms melting at 196°–207° C., with decomposition. The free base, i.e., 2-phenyl-1-(4-piperidyl)-3-(4-pyridyl)propane was obtained by dissolving the hydrochloride salt in water, making the solution alkaline with dilute sodium hydroxide, extracting the free base, thus formed, into dichloromethane, washing the dichloromethane layer with water, drying the washed extracts over anhydrous sodium sulfate and concentrating the extracts.

EXAMPLE 13

(A) A solution of 2 - phenyl - 1-(4-piperidyl)-3-(4-pyridyl)propane hydrochloride (15.75 millimole), produced as described in Example 12, in 30 ml. of ethanol was hydrogenated at a temperature of 80°–90° C. under a pressure of 100 atmospheres in the presence of 1.0 gram of rhodium. After the required amount of hydrogen was absorbed, the catalyst was removed by filtration and 5 ml. of a 5.5 N solution of isopropanolic hydrogen chloride was added to the filtration. The solution was cooled in an ice bath and the product precipitated by the addition of 200 ml. of hexane to give 2-phenyl 1,3 - di(4 - piperidyl)propane dihydrochloride monohydrate as colorless needles melting at 170°–175° C., with decomposition.

(B) A solution of 9.3 grams (33.2 millimole) of 2-phenyl-1-(4-piperidyl) - 3 - (4-pyridyl)propane, produced as described in Example 12, in 25 ml. of 90 percent formic acid was cooled in an ice bath and 10 ml. of 37.5 percent formaldehyde was added. The reaction mixture was heated under reflux for 17 hours on a steam bath, 6 ml. of concentrated hydrochloric acid was added and the reaction mixture concentrated in vacuo to an oil. The residue was dissolved in 25 ml. of water and the solution was made strongly basic by the addition of 10 N sodium hydroxide. The deposited oil was extracted into three times, using 100 ml. of ether each time, washed twice using 50 ml. of water each time, then washed with 50 ml. of brine, dried over anhydrous sodium sulfate and concentrated in vacuo to an oil. The oil was dissolved in 25 ml. of methanol, cooled in an ice bath and 1 ml. of concentrated sulfuric acid was added. 1-(1-methyl-4-piperidyl) - 2 - phenyl-3-(4-pyridyl)propane disulfate crystallized, upon the slow addition of ether, as colorless prisms melting at 210°–222° C. Thereafter, the free base, that is, 1 - (1-methyl-4-piperidyl)-2-phenyl-3-(4-pyridyl)propane, was obtained by dissolving the disulfate salt in water, making the solution alkaline with dilute sodium hydroxide, extracting the free base, thus formed, into dichloromethane, washing the dichloromethane layer with water, drying the washed extracts over anhydrous sodium sulfate and concentrating the extracts.

EXAMPLE 14

A solution of 4.9 grams (16.7 millimoles) of 1-(1-methyl-4-piperidyl) - 2 - phenyl-3-(4-pyridyl)propane, produced as described in Example 13, in 200 ml. of 1 N HCl was hydrogenated in the presence of a platinum catalyst at atmospheric pressure and at a temperature of 25° C. After the required amount of hydrogen had been absorbed, the catalyst was separated by filtration over a small bed of "Hyflo." The filtrate was cooled with 100 grams of ice and made strongly alkaline with a 10 N sodium hydroxide solution. The deposited oil was extracted three times using 100 ml. of an ether-benzene mixture (1:1) each time. The combined extracts were washed with three times using 50 ml. of brine each time, dried over anhydrous sodium sulfate and concentrated in vacuo to a colorless oil. The oil, that is, crude 1-(1-methyl-4-piperidyl)-2-phenyl - 3-(4 - piperidyl)propane, was dissolved in 25 ml. of ethanol, cooled in an ice bath and one equivalent of para-toluene sulfonic acid was added. 1 - (1 - methyl-4-piperidyl) - 2 - phenyl-3-(4-piperidyl)propane para-toluene sulfonate crystallized upon the slow addition of ether, as colorless prisms, melting at 153°–156° C.

EXAMPLE 15

A solution of 2.7 grams (9.0 millimoles) of the crude 1-(1-methyl - 4 - piperidyl) - 2 - phenyl-3-(4-piperidyl)propane produced as described in Example 14, in 25 ml. of 90% formic acid was cooled in an ice bath and 10 ml. of 37.5% formaldehyde was added. The reaction mixture was heated under reflux for 21 hours on a steam bath, 2 ml. of concentrated hydrochloric acid was added and the reaction mixture concentrated in vacuo to an oil. The residue was dissolved in 25 ml. of water and the solution was made strongly basic by the addition of 10 N sodium hydroxide. The deposited oil was extracted three times into ether, using 100 ml. of ether each time, washed twice using 50 ml. of water each time and one time using 50 ml. of brine, dried over anhydrous sodium sulfate and concentrated on a steam bath to a small volume. Upon cooling the ether solution in an ice bath, the product, 1,3-di-(1-methyl-4-piperidyl)-2-phenylpropane, crystallized as colorless rods, melting at 96° to 97° C.

EXAMPLE 16

A solution of 1.5 grams (4.9 millimoles) of tris(4-pyridylmethyl)methanol in 35 ml. of ethanol was hydrogenated at 100° C. and 1500 p.s.i. under hydrogen in the presence of 0.25 gram of rhodium metal catalyst. The bomb was washed with ethanol and the catalyst removed by filtration giving a colorless solution. Removal of the solvent in vacuo gave tris(4 - piperidylmethyl)methanol melting at 170° to 177° C. Recrystallization from methylene chloride-hexane yielded the base, in the form of colorless prisms, melting at 175° to 179° C.

Tris(4-pyridylmethyl)methanol, melting point of 205° to 206°, was prepared by the dropwise addition of 0.2 mole of ethyl chloroformate, in dry tetrahydrofuran to about 0.5 mole of 4-picolyl lithium at −40° C. The reaction mixture, after hydrolysis with hydrochloric acid was worked up by conventional means to obtain the desired compound.

EXAMPLE 17

A solution of 12.3 grams (38.4 millimoles) of 2-(4-methoxyphenyl) - 1,3 - di(4-pyridyl)-2-propanol in 300 ml. of 3 N hydrochloric acid was treated with hydrogen at 60° C. under 60 atmospheres of pressure in the presence of 1.0 gram of platinum catalyst. When the hydrogenation was completed, the reaction mixture was filtered to remove the catalyst and poured into an excess of iced ammonium hydroxide. Extraction with methylene chloride followed by drying over magnesium sulfate and removal of the solvent in vacuo yielded 2-(4-methoxyphenyl)-1,3-di(4 - piperidyl)propane, as a pale yellow oil. Treatment of the free base, thus obtained, with an excess of maleic acid in ethanol gave the dimaleate salt of 2-(4-methoxyphenyl) - 1,3 - di(4-piperidyl)propane, melting at 170° to 174° C. An analytical sample was prepared from ethanol as colorless prisms, melting at 170° to 174° C.

The 2-(4 - methoxyphenyl) - 1,3 - di(4-pyridyl)-2-propanol, which was used as the starting material in this example, was prepared by reacting 0.5 mole of 4-picolyl lithium with 0.2 mole of p-methoxy benzoyl chloride in tetrahydrofuran as a solvent.

EXAMPLE 18

In this example, a mixture of 4.95 grams (23 millimoles) of 1,3-di(4-pyridyl)-2-propanol in 100 ml. of ethanol was heated at a temperature of 100° C., under 100 atmospheres of hydrogen, in the presence of 1.0 gram of rhodium metal catalyst. When the hydrogenation was complete, the catalyst was removed by filtration and the solvent removed in vacuo to yield 1,3-di(4-piperidyl)-2-propanol as a colorless oil which slowly crystallized to a mass, melting point at 100° to 110° C. Recrystallization from methylene chloride-hexane yielded 1,3-di(4-piperidyl)-2-propanol as colorless needles, melting at 115° to 117° C.

The 1,3-di(4-pyridyl)-2-propanol starting material was prepared as follows: to 0.5 mole of 4-picolyl lithium, stirred at −50° C. and protected with dry nitrogen, there was added, in a dropwise fashion over a period of thirty minutes 14.8 grams (0.20 mole) of ethyl formate in 50 ml. of tetrahydrofuran. The temperature of the reaction was allowed to reach room temperature, following which it was stirred overnight. The reaction mixture was hydrolyzed and then extracted with 6 N hydrochloric acid. Neutralization of the acid extract with iced ammonium hydroxide and extraction with methylene chloride yielded, after drying over magnesium sulfate and concentration in vacuo, 1,3-di(4-pyridyl)-2-propanol. Crystallization from hexane yielded 1,3-di(4-pyridyl)-2-propanol melting at 95° to 105° C.

EXAMPLE 19

In this example, a solution of 11.5 grams (38.8 mmole) of 2-cyclohexyl-1,3-di(pyridyl)-2-propanol in 300 ml. of ethanol was hydrogenated in the presence of 1 gram of rhodium. The hydrogenation was carried out for a period of 4.5 hours at a temperature within the range of from about 98° C. to 102° C. under an initial hydrogen pressure of 1515 p.s.i. at room temperature. When the hydrogenation was complete, the solvent and the catalyst were removed to obtain an oil, which upon crystallization from hexane, yielded 2-cyclohexyl-1,3-di(4-piperidyl)-2-propanol melting at 110° C. to 113° C. Recrystallization of this product from hexane yielded 2-cyclohexyl-1,3-di(4-piperidyl)-2-propanol in the form of colorless plates melting at 113° C. to 115° C.

The preparation of the starting 2-cyclohexyl-1,3-di(4-pyridyl)-2-propanol is given hereinafter for the sake of completeness of disclosure. It is to be understood, however, that neither the starting compound nor the method for its preparation is part of this invention. In the preparative method, a solution of 23.9 grams (0.2 mole) of hexahydrobenzoyl chloride in 75 ml. of anhydrous tetrahydrofuran was added slowly, over a period of about 30 minutes, to a 0.5 molar solution of 4-picolyl lithium. During the addition, the latter solution was maintained at a temperature of about −20° C. When the addition was completed, the reaction mixture was stirred at a temperature of −20° C. for a period of about thirty minutes, following which it was stirred at room temperature for a period of about two hours. At the end of that period of time, 1.0 liter of water was added to the reaction mixture. The resulting solution was acidified using 3 N hydrochloric acid. A two-layer system was formed. These layers were separated and the organic base was extracted two times using 200 ml. of hydrochloric acid each time. The acid extracts were combined, washed three times using 200 ml. of ether each time and made alkaline with 10 N sodium hydroxide solution. The alkaline solution was allowed to stand at room temperature overnight and, as a result thereof, a precipitate formed. The precipitate was removed by filtration, washed, first, five times using 100 ml. of water each time, and, thereafter, three times using 100 ml. of ether each time. The precipitate was recrystallized from an acetone-hexane mixture to yield 2-cyclohexyl-1,3-di(4-pyridyl)-2-propanol, as colorless prisms, melting at 176° C. to 178° C.

EXAMPLE 20

In this example, a mixture of 2.0 grams (6.95 mmole) of 1,3-di(4-pyridyl)-2-(o-tolyl)propane, 200 ml. of ethanol and 1.0 gram of rhodium was hydrogenated over a two hour period at a temperature within the range of from about 90° C. to 95° C. under an initial hydrogen pressure of 1550 p.s.i. When the hydrogenation was complete, the catalyst and the solvent were removed to yield 1,3-di(4-piperidyl)-2-(o-tolyl)propane as a pale yellow oil. Upon treatment with hydrogen chloride, there was obtained 1,3-di(4-piperidyl)-2-(o-tolyl)propane dihydrochloride hemihydrate melting at 151° C., with decomposition.

While not within the scope of the present invention, the preparation of the starting 1,3-di(4-pyridyl)-2-(o-tolyl)-2-propane is given herein for completeness of disclosure. In the preparative method, 0.2 mole of o-toluic acid chloride dissolved in 150 ml. of tetrahydrofuran was added, in a dropwise fashion over a period of about sixty minutes, to a stirred solution of 0.5 mole of 4-picolyl lithium. The addition was carried out in an atmosphere of dry nitrogen, with the 4-picolyl lithium solution being cooled to −30° C. to −50° C. The reaction mixture was treated with 100 ml. of water within a three hour period, following which it was extracted three times, using 150 ml. of 6 N hydrochloric acid each time. The acid extract was washed three times, using 150 ml. of ether each time. The product was liberated by stirring with a mixture of 500 grams of ice and 300 ml. of concentrated ammonium hydroxide. Ice was added, as needed, to maintain the temperature at about 0° C.

The mixture was then filtered to yield an orange-colored solid. The solid was washed with a mixture of 200 ml. of methylene chloride and 400 ml. of water. The solid was then crystallized from acetone to yield 1,3-di(4-pyridyl)-2-(o-tolyl)-2-propanol, melting at 154° to 156° C. as white prisms.

A solution of 10.0 grams (33 mmole) of 1,3-di(4-pyridyl)-2-(o-tolyl)-2-propanol, produced as described in the preceding paragraph, in 75 ml. of 75% sulphuric acid was heated at a temperature of about 95° C. for a period of about two hours. This solution was cooled and, thereafter, it was poured over iced ammonium hydroxide and extracted with ether. The extract was dried and concentrated, in vacuo, to provide an oil-like residue. This residue was subsequently hydrogenated at room temperature and atmospheric pressure in ethyl acetate using a palladium-charcoal catalyst. When the hydrogenation was complete, the catalyst was removed by filtration, and the solvent was removed by heating in vacuo.

There was, thus obtained, 1,3-di(4-pyridyl)-2-(o-tolyl)propane in the form of an oil, which yielded crystals, melting point 100° C. to 103° C., on standing. Recrystallization of the product from hexane yielded colorless needles, melting point at 100° C. to 102° C.

EXAMPLE 21

In this example, a mixture of 3.0 grams (12.6 mole) of 2-isopropyl-1,3-di(4-pyridyl)propene, 200 ml. of ethanol and 1.0 gram of rhodium was hydrogenated for a period of about 2.5 hours at a temperature within the range of from about 90° C. to 100° C. under an initial hydrogen pressure of 1450 p.s.i. When the hydrogenation reaction was complete, the solvent and the catalyst were removed to yield an oily residue which crystallized slowly to a mass melting at 75° C. to 80° C. Recrystallization of this mass from hexane yielded 2-isopropyl-1,3-di(4-piperidyl)propane in the form of colorless prisms melting at 77° C. to 79° C. Treatment of that compound with hydrogen chloride yielded the dihydrochloride salt of 2-isopropyl-1,3-di(4-piperidyl)propane, melting point at 330° C. to 335° C.

In an alternate preparative method, 13 grams (50.7 mmole) of 2-isopropyl-1,3-di(4-pyridyl)propene in 200 ml. of 3 N hydrochloric acid was directly dehydrated and reduced, in the presence of platinum oxide at a temperature of 60° C. and under hydrogen pressure of 955 p.s.i. to yield 2-isopropyl-1,3-di(4-piperidyl)propane. This base was converted to the dihydrochloric acid/salt by treatment with hydrogen chloride.

The preparation of the 2-isopropyl-1,3-di(4-pyridyl) propene which is used as the starting material in this example is set forth hereinafter for completeness of disclosure. It should be understood, however, that neither the compound, nor the process for its preparation, is part of the present invention. Thus, in this preparative method, a solution of 0.5 mole of 4-picolyl lithium in tetrahydrofuran was first prepared. This solution was brought to a temperature within the range from about −30° C. to −50° C. To this cooled solution there was added, under an atmosphere of dry nitrogen, 0.2 mole of isobutyryl chloride dissolved in 150 ml. of tetrahydrofuran. This addition was effected, in a dropwise fashion over a period of about sixty minutes. Thereafter, the reaction mixture was stirred oevrnight, following which it was diluted with 150 ml. of water. The reaction mixture was extracted three times, using 100 ml. portions of 6 N hydrochloric acid each time. The acid extracts were then stirred in a mixture of 500 grams of ice and 300 ml. of concentrated ammonium hydroxide with the temperature being maintained at about 0° C. The product, thus obtained, was extracted three times, using 150 ml. of methylene chloride, each time. The organic extracts were dried over magnesium sulfate and reduced, in vacuo to yield an oil-like product. This oil was crystallized from hexane to yield 2-isopropyl-1,3-di(4-pyridyl)-2-propanol, in crystalline form, melting at 135° to 153° C. Recrystallization of the compound three times from acetone herein yielded 2-isopropyl-1,3-di(4-pyridyl) - 2 - propanol in the form of colorless prisms, melting at 155.5° to 157° C.

A mixture of 5 grams of 2-isopropyl-1,3-di(4-pyridyl)-2-propanol, produced as described in the preceding paragraph, and 100 ml. of 75% by volume of sulfuric acid, was heated at a temperature of 75° C. for 17 hours. The acidic solution was poured into an excess of ice ammonia and extracted with methylene chloride. The organic extract was dried over anhydrous magnesium sulfate and it was concentrated, in vacuo, to yield 2-isopropyl-1,3-di(4-pyridyl)propene as a colorless oil.

EXAMPLE 22

A solution of 20 grams of 2-phenyl-1,3-di(4-piperidyl)-2-propanol in 25 ml. of concentrated hydrochloric acid was heated under reflux for a period of about 24 hours. At the end of that time, the reaction mixture was concentrated, under reduced pressure, and the oily residue thus obtained was crystallized from a mixture of isopropanol and ether. Recrystallization from an isopropanol-ether mixture yielded 2-phenyl-1,3-di(4-piperidyl)propene dihydrochloride hydrate as white prisms melting at 171° to 191° C., with decomposition.

A solution of 1 gram of the salt, obtained as described in the preceding paragraph, was treated an excess of dilute sodium carbonate solution and the free base was extracted into ether (3 × 30 ml.). The ether extracts were combined, washed with water, dried over sodium sulfate, filtered and evaporated to give, after concentration 2-phenyl-1,3-di(4-piperidyl)propene free base in the form of white prisms. Recrystallization from an ether-petroleum ether mixture yielded the pure compound melting at 103° to 105°.

The starting compound in the example, i.e. 2-phenyl-1,3-di(4-piperidyl)-2-propanol, was produced as described in Example 9.

EXAMPLE 23

This example is included herein to demonstrate the preparation of dosage forms containing as the active ingredient representative compounds of this invention.

(a) Capsule formulation: 10 mg. of cis-2-phenyl-3(4-piperidyl) - 1 - (4-pyridyl)-1-propene maleate were mixed with 165 mg. of lactose, U.S.P. and 30 mg. of corn starch, U.S.P. The mixture was then blended by passing through a Fitzpatrick Comminuting Machine with a No. 1A screen with knives forward. The blended powder was, thereafter, returned to the mixer and 5 mg. of talc was added thereto and blended therewith. The product was subsequently filled into hard shell gelatin capsules.

(b) Tablet formulation: 5.10 mg. of cis-2-phenyl-3(4-piperidyl)-1-(4-pyridyl)-1-propene maleate were mixed with 84.40 mg. of lactose, U.S.P., 10.0 mg. of corn starch and 0.5 mg. of magnesium stearate. The mixture was blended by passing through a Fitzpatrick Communiting Machine, fitted with a No. 1A screen with knives forward. The powder was then slugged on a tablet compressing machine, following which the slugs were comminuted using a No. 16 screen. The mixture was compressed at a tablet weight of 100 mg. using tablet punches having a diameter of approximately ¼ inch.

(c) Parenteral formulation: 5.0 mg. of cis-2-phenyl-3(4-piperidyl)-1-(4-pyridyl)-1-propene maleate were slurried in a small amount of water. To the slurry there was added slowly maleic acid to pH of 3.0. Thereafter, 4.5 mg. of phenol (anhydrous) was added to the solution. The solution was filtered and allowed to stand for twenty-four hours. Thereafter, the filtrate was filtered through a O2 Selas candle. The filtrate was then filled into ampuls under an atmosphere of nitrogen, which were then sealed. The amplus were sterilized for twenty minutes at a temperature of 250° F.

EXAMPLE 24

This example is included herein to demonstrate the preparation of dosage forms containing as the active ingredient another representative compound of this invention.

(a) Capsule formulation: 25 mg. of 2-phenyl-1,3-di(4-piperidyl)propane dihydrochloride hydrate were mixed with 150 mg. of lactose, U.S.P. and 30 mg. of corn starch, U.S.P. The mixture was then blended by passing through a Fitzpatrick Comminuting Machine with a No. 1A screen with knives forward. The blended powder was, thereafter, returned to the mixer and 5 mg. of talc was added thereto and blended therewith. The product was subsequently filled into hard shell gelatin capsules.

(b) Tablet formulation: 10.20 mg. of 2-phenyl-1,3-di(4 - piperidyl)propane dihydrochloride hydrate were mixed with 79.30 mg. of lactose, U.S.P., 10.0 mg. of corn starch and 0.5 mg. of magnesium stearate. The mixture was blended by passing through a Fitzpatrick Comminuting Machine, fitted with a No. 1A screen with knives forward. The powder was then slugged on a tablet compressing machine, following which the slugs were comminuted using a No. 16 screen. The mixture was compressed at a tablet weight of 100 mg. using tablet punches having a diameter of approximately ¼ inch.

(c) Parenteral formulation: 5.0 mg. of 2-phenyl-1,3-di(4 - piperidyl)propane dihydrochloride hydrate were slurried in a small amount of water. To the slurry there was added slowly maleic acid to pH of 3.0. Thereafter, 4.5 mg. of phenol (anhydrous) was added to the solution. The solution was filtered and allowed to stand for twenty-four hours. Thereafter, the filtrate was filtered through a O2 Selas candle. The filtrate was then filled into ampuls under an atmosphere of nitrogen, which were then sealed. The ampuls were sterilized for twenty minutes at a temperature of 250° F.

We claim:
1. A compound selected from the group consisting of a member of the formula

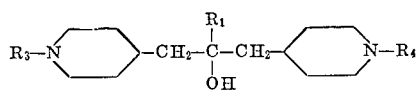

in which $R_1$ is a member selected from the group consisting of an alkyl group having from 1 to 12 carbon atoms, a cyclo-alkyl group having from 3 to 8 carbon atoms, an aryl radical selected from the group consisting of phenyl, lower alkyl phenyl, halogen substituted phenyl, lower alkoxy phenyl and lower alkyl mercapto phenyl; benzyl; a 5 or 6-membered saturated heterocyclic radical selected from the group consisting of pyrrolidinyl, lower alkyl substituted pyrrolidinyl, piperidyl and lower alkyl substituted piperidyl;
in which $R_3$ is a member selected from the group consisting of hydrogen and an alkyl group having from 1 to 6 carbon atoms; and
in which $R_4$ is a member selected from the group consisting of hydrogen and an alkyl group having from 1 to 6 carbon atoms
and salts thereof with medicinally acceptable acids.

2. 2-phenyl-1,3-di(4-piperidyl)-2-propanol.
3. 1,3-bis(1-methyl-4-piperidyl)-2-phenyl-2-propanol.
4. A compound selected from the group consisting of a member of the formula

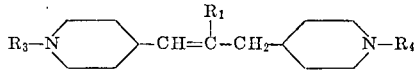

in which $R_1$ is a member selected from the group consisting of hydrogen, an alkyl group having from 1 to 12 carbon atoms, a cycloalkyl group having from 3 to 8 carbon atoms, an aryl radical, selected from the group consisting of phenyl, lower alkyl phenyl, halogen substituted phenyl, lower alkoxy phenyl and lower alkyl mercapto phenyl; benzyl; a 5- or 6-membered saturated heterocyclic radical selected from the group consisting of pyrrolidinyl, lower alkyl substituted pyrrolidinyl, piperidyl and lower alkyl substituted piperidyl;
in which $R_3$ is a member selected from the group consisting of hydrogen and an alkyl group having from 1 to 6 carbon atoms; and
in which $R_4$ is a member selected from the group consisting of hydrogen and an alkyl group having from 1 to 6 carbon atoms
and salts thereof with medicinally acceptable acids.

5. 1-(1 - methyl - 4 - piperidyl)-2-phenyl-3-(4-pyridyl) propane.
6. Tris(4-piperidylmethyl)methanol.
7. 1,3-bis-(1-methyl-4-piperidyl)-2-phenylpropene.
8. A compound selected from the group consisting of a member of the formula

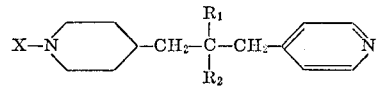

a member of the formula

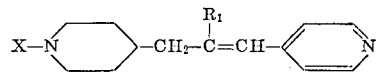

in which $R_1$ is a member selected from the group consisting of hydrogen, an alkyl group having from 1 to 12 carbon atoms, a cycloalkyl group having from 3 to 8 carbon atoms, an aryl radical, selected from the group consisting of phenyl, lower alkyl phenyl, halogen substituted phenyl, lower alkoxy phenyl and lower alkyl mercapto phenyl; benzyl; a 5 or 6-membered saturated heterocyclic radical selected from the group consisting of pyrrolidinyl, lower alkyl substituted pyrrolidinyl, piperidyl and lower alkyl substituted piperidyl;
in which $R_2$ is a member selected from the group consisting of hydrogen and hydroxy and
in which X is a member selected from the group consisting of hydrogen and lower alkyl
and salts thereof with medicinally acceptable acids.

9. 2-phenyl-1-(4-piperidyl)-3-(4-pyridyl)-2-propanol.
10. Cis - 2 - phenyl - 3 - (4-piperidyl)-1-(4-pyridyl)-1-propene.
11. 2-phenyl-1-(4-piperidyl)-3-(4-pyridyl)propane.
12. Tris(4-pyridylmethyl)methanol.

References Cited
UNITED STATES PATENTS

| | | | |
|---|---|---|---|
| 2,624,738 | 1/1953 | Goldberg et al. | 260—293 |
| 2,712,022 | 6/1955 | Adamson | 260—240 X |
| 2,712,023 | 6/1955 | Adamson | 260—240 X |
| 3,268,541 | 8/1966 | Gurien et al. | 260—296 |

(Other references on following page)

| UNITED STATES PATENTS | | | |
|---|---|---|---|
| 2,941,004 | 6/1960 | Pinson et al. | 260—567.6 |
| 3,103,515 | 9/1963 | Zaugg et al. | 260—292 |

OTHER REFERENCES

Profft et al.: J. Prakt. Chim. [4] 2, 316–23 (1955).
Schwarting et al.: Lloydia 26, 258–73 (1963).
Chem. Absts. 60: 2136S (1964).

HENRY R. JILES, Primary Examiner

G. T. TODD, Assistant Examiner

U.S. Cl. X.R.

260—240 R, 293 DC, 293.4 A, 294 S, 294.7 G, 296 D; 424—263, 267